(12) United States Patent
Yamashita

(10) Patent No.: US 11,916,656 B2
(45) Date of Patent: Feb. 27, 2024

(54) WIRELESS COMMUNICATION SYSTEM

(71) Applicant: NIPPON TELEGRAPH AND TELEPHONE CORPORATION, Tokyo (JP)

(72) Inventor: Fumihiro Yamashita, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 45 days.

(21) Appl. No.: 17/762,389

(22) PCT Filed: Sep. 27, 2019

(86) PCT No.: PCT/JP2019/038329
§ 371 (c)(1),
(2) Date: Mar. 22, 2022

(87) PCT Pub. No.: WO2021/059522
PCT Pub. Date: Apr. 1, 2021

(65) Prior Publication Data
US 2022/0345236 A1 Oct. 27, 2022

(51) Int. Cl.
*H04J 1/04* (2006.01)
*H04J 1/08* (2006.01)
(Continued)

(52) U.S. Cl.
CPC ........ *H04J 1/04* (2013.01); *H04J 1/08* (2013.01); *H04L 27/2602* (2013.01); *H04W 52/52* (2013.01)

(58) Field of Classification Search
CPC ......... H04J 1/08; H04L 1/1812; H04L 1/1854
(Continued)

(56) References Cited

U.S. PATENT DOCUMENTS

| | | | | |
|---|---|---|---|---|
| 4,885,802 A | * | 12/1989 | Ragan | H03D 7/166 455/45 |
| 2010/0105332 A1 | * | 4/2010 | McHenry | H04W 16/14 455/62 |

FOREIGN PATENT DOCUMENTS

JP 2014207553 A 10/2014

OTHER PUBLICATIONS

Fumihiro Yamashita et al., Direct Spectrum Division Transmission adapter for Cognitive multiple system overlay on satellite transponders, IEICE Technical Report, vol. IEICE-117, No. 261, 2017.
(Continued)

*Primary Examiner* — Dang T Ton
(74) *Attorney, Agent, or Firm* — Harness, Dickey & Pierce, P.L.C.

(57) ABSTRACT

In a wireless communication system that performs a wireless communication by performing band division into a plurality of sub-spectra, a transmission device includes a band division unit and a transmission gain control unit configured to control a transmission gain of each of transmission signals of a plurality of sub-spectra for each sub-spectrum in accordance with information that is related to a power density of each sub-spectrum and fed back from a reception device so that the power density of each of reception signals of the plurality of sub-spectra on the reception device is uniform, and the reception device includes a reception power density detection unit configured to detect the power density of each of the plurality of sub-spectra to be received, a feedback unit configured to feed back information regarding the power density to the transmission device, and a band synthesis unit. Thus, it is possible to avoid deterioration of signal quality in hand division and synthesis transmission.

8 Claims, 9 Drawing Sheets

(51) Int. Cl.
*H04L 27/26* (2006.01)
*H04W 52/52* (2009.01)
(58) Field of Classification Search
USPC .......................... 370/329, 400, 401, 403, 406
See application file for complete search history.

(56) References Cited

OTHER PUBLICATIONS

Jun-ichi Abe et al., Proposal of Amplitude Characteristic Compensation Method for Direct Spectrum Division Transmission Adapter, 2017 IEICE General Conference, Mar. 22, 2017.

* cited by examiner

WIRELESS COMMUNICATION SYSTEM

CROSS-REFERENCE TO RELATED APPLICATIONS

This application is a 371 U.S. National Phase of International Application No. PCT/JP2019/038329, filed on Sep. 27, 2019. The entire disclosure of the above application is incorporated herein by reference.

TECHNICAL FIELD

The present invention relates to a wireless communication system that performs a wireless communication by performing band division of a spectrum of a transmission signal into a plurality of sub-spectra.

BACKGROUND ART

In a general wireless communication, there is a problem, in a case where an analog reception signal is too weak, of the signal being hidden by a quantization error when the analog reception signal is converted into a digital signal, and on the contrary, in a case where the analog reception signal is too large, the signal being saturated when the analog reception signal is converted into the digital signal. Thus, gain control for adjusting the power density of the reception signal is performed.

In particular, in a case of performing band division and synthesis transmission, a transmission device performs band division of the spectrum of a transmission signal into a plurality of sub-spectra on a frequency axis and maps and transmits the sub-spectra at different frequencies and a reception device performs band synthesis after returning a plurality of sub-spectra to be received to the original frequency positions on the frequency axis. Thus, it is essential to adjust the power density between the sub-spectra. For example, in band division and synthesis transmission, in principle, band synthesis is performed on the premise that the power densities of the adjacent sub-spectra in the reception signal are the same so that the circuit quality does not deteriorate. Thus, it is necessary to control so that the power densities of the adjacent sub-spectra before band synthesis is performed on the reception device are uniform (the variation of the power density is within a predetermined range (preferably, the same)). Thus, typical reception devices include a reception gain control device for causing the power densities of a plurality of sub-spectra of a reception signal to be uniform (for example, see NPL 1).

CITATION LIST

Non Patent Literature

NPL 1: Fumihiro Yamashita, et al., "Direct Spectrum Division Transmission adapter for Cognitive multiple system overlay on satellite transponders", IEICE-SAT, vol. 117, no. 261, SAT 2017-54, pp, 115-120, October 2017.

SUMMARY OF THE INVENTION

Technical Problem

In band division and synthesis transmission, in a transmission device, a signal of a sub-spectrum obtained by a band division filter performing band division is mapped at a frequency predetermined by a frequency shifter and transmitted. Here, in a case where signals resulting from the band division are a divided signal A and a divided signal B, the divided signal A and the divided signal B are obtained by being divided at the same power density, but in a case where a satellite transponder having non-flat frequency characteristics is provided between the transmission device and the reception device, when the divided signal A and the divided signal B transmitted at the same power density on the transmission device are received on the reception device, a power density difference occurs between the divided signal A and the divided signal B. For example, in the same satellite transponder, a plurality of signals passes through the same analog device, and thus a large power density difference is unlikely to occur between the divided signals, but in a case where a plurality of divided signals is distributed and relayed to a plurality of satellite transponders having different level diagrams, a large power density difference may occur between the divided signals received on the reception device. There are many similar cases not only in the satellite transponder but also in various other communication systems.

As described above, in a state where there is a large power density difference between sub-spectra, if noise of the reception device overlays the reception signal, there arises a problem of a carrier-to-noise ratio (C/N ratio) of each divided signal varying greatly.

Thus, in the related art, the power densities (for example, an average value of the power densities) corresponding to the passband of signals of the respective sub-spectra are calculated on the reception device, and the reception gains of the signals of the respective sub-spectra are adjusted so that the values of the power densities of reception signals of the respective sub-spectra are to be averaged. This causes the power densities of a plurality of sub-spectra to be uniform and, in principle, allows band synthesis of signals of the plurality of sub-spectra without deteriorating the characteristics of the reception signal.

However, when a function of adjusting the reception gain, which is provided in the reception device in the related art operates, a divided signal (for example, the divided signal A) having a small power density among the plurality of received sub-spectra is multiplied by a large gain. At this time, the noise overlaying the divided signal A is similarly multiplied by a large gain, and the absolute value of the noise power overlaying the divided signal A increases. Meanwhile, since the divided signal (for example, the divided signal B) having a small power density among the plurality of received sub-spectra is larger in power than the divided signal A, the divided signal is not multiplied by a large gain, and the power density of the signal and the noise only needs to slightly change, and the absolute value of the noise power overlaying the divided signal B does not substantially change even though the reception gain is controlled.

As described above, when band synthesis is performed in a state where the C/N ratios of the respective divided signals are greatly different from each other, small noise power overlays a part of band of the reception signal, and large noise power overlays the other bands of the same reception signal, and thus a problem of signal quality being deteriorated occurs.

An object of the present invention is to provide a wireless communication system capable of avoiding deterioration of signal quality by controlling transmission power density of each sub-spectrum transmitted from a transmission device so that power densities of reception signals of a plurality of sub-spectra are uniform, in the wireless communication system that performs a wireless communication by performing band division of a spectrum of a transmission signal into the plurality of sub-spectra.

Means for Solving the Problem

The present invention provides a wireless communication system that performs a wireless communication by performing band division of a spectrum of a transmission signal into a plurality of sub-spectra including a transmission device and a reception device, wherein the transmission device includes a band division unit configured to perform band division of a transmission signal into a plurality of sub-spectra, and a transmission gain control unit configured to control a transmission gain of each of a plurality of the transmission signals of the plurality of sub-spectra for each of the plurality of sub-spectra in accordance with information that is related to a power density of each of the plurality of sub-spectra and fed back from the reception device so that the power density of a reception signal of each of the plurality of sub-spectra on the reception device is uniform, and the reception device includes a reception power density detection unit configured to detect the power density of each of the plurality of sub-spectra to be received from the transmission device, a feedback unit configured to feed back to the transmission device the information regarding the power density of each of the plurality of sub-spectra, and a band synthesis unit configured to perform band synthesis of the plurality of reception signals of the plurality of sub-spectra.

The present invention also provides a wireless communication system that performs a wireless communication by performing band division of a spectrum of a transmission signal into a plurality of sub-spectra including a transmission device, a reception device, and a relay device, wherein the transmission device includes a band division unit configured to perform band division of a transmission signal into a plurality of sub-spectra, the relay device includes a transmission gain control unit configured to control a transmission gain for each of the plurality of sub-spectra when signals of the plurality of sub-spectra received from the transmission device are transmitted to the reception device in accordance with information that is related to a power density of each of the plurality of sub-spectra and fed back from the reception device so that the power density of the plurality of sub-spectra on the reception device is uniform, and the reception device includes a reception power density detection unit configured to detect the power density of each of the plurality of sub-spectra to be received from the transmission device, a feedback unit configured to feed back to the relay device the information regarding the power density of each of the plurality of sub-spectra, and a band synthesis unit configured to perform band synthesis of the plurality of reception signals of the plurality of sub-spectra.

Effects of the Invention

According to the present invention, a wireless communication system is capable of avoiding deterioration of signal quality by controlling transmission power density of each sub-spectrum transmitted from a transmission device so that power densities of reception signals of a plurality of sub-spectra are uniform, in the wireless communication system that performs a wireless communication by performing band division of a spectrum of a transmission signal into the plurality of sub-spectra.

DESCRIPTION OF EMBODIMENTS

Hereinafter, an embodiment of a wireless communication system according to the present invention will be described with reference to the drawings.

Configuration Example (1)

Figure 1:
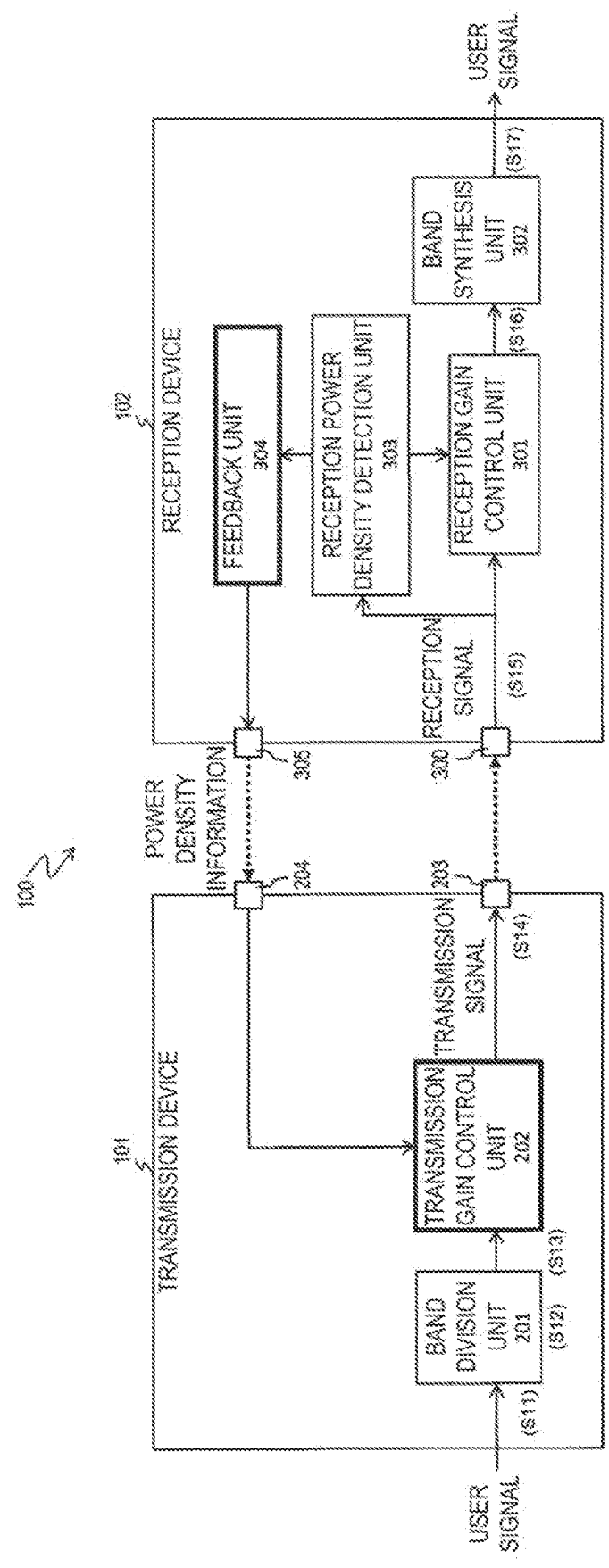
FIG. 1 is a diagram illustrating a configuration example (1)) of a wireless communication system according to an embodiment.

FIG. 1 illustrates a configuration example (1) of a wireless communication system 100 according to an embodiment. In FIG. 1, the wireless communication system 100 performs band division and synthesis transmission between a transmission device 101 and a reception device 102. The transmission device 101 performs band division of the spectrum of a user signal into a plurality of sub-spectra and then transmits the resultant of the band division, and the reception device 102 performs band synthesis of a plurality of received sub-spectra to restore the user signal. The transmission device 101 and the reception device 102 perform a communication via a repeater having non-flat frequency characteristics, such as a communication satellite. Thus, when signals of a plurality of sub-spectra transmitted at the same power density on the transmission device 101 are received on the reception device 102, a power density difference occurs between the plurality of sub-spectra of the reception signal. Thus, the wireless communication system 100 according to the embodiment has a function of performing control so that the power densities of the plurality of sub-spectra received by the reception device 102 are uniform.

The configuration of the transmission device 101 and the reception device 102 will be described below in detail.

In FIG. 1, the transmission device 101 includes a band division unit 201, a transmission gain control unit 202, a transmission unit 203, and a reception unit 204.

The band division unit 201 divides an input signal on the frequency axis. For example, the band division unit 201 receives an input of a user signal to be transmitted to the reception device 102 and performs band division of the spectrum of the user signal into a plurality of sub-spectra. The band division is performed by a band division filter, for example. Alternatively, the band division unit 201 may perform discrete Fourier transform and inverse discrete Fourier transform to perform band division in the frequency domain. Here, in the embodiment, the band division unit 201 has a function of a frequency shifter that shifts signals of a plurality of sub-spectra obtained by band division to different frequencies. The band division unit 201 outputs signals of the plurality of sub-spectra, which have been frequency-shifted, to the transmission gain control unit 202.

The transmission gain control unit 202 performs a gain control based on information of a power density of a reception signal, which is fed back from the reception device 102, so that signal levels of the plurality of sub-spectra obtained by the band division are uniform.

The transmission unit 203 has a function of transmitting, from an antenna, a transmission signal output by the transmission gain control unit 202.

The reception unit 204 receives and demodulates the signal transmitted from the reception device 102 by a reception antenna and outputs information (for example, the above-described power density information) demodulated to the transmission gain control unit 202. The demodulation function may be provided not on the reception unit 204 side but on the transmission gain control unit 202 side.

Meanwhile, in FIG. 1, the reception device 102 includes a reception unit 300, a reception gain control unit 301, a band synthesis unit 302, a reception power density detection unit 303, a feedback unit 304, and a transmission unit 305.

The reception unit 300 receives and demodulates the signal transmitted from the transmission device 101 by a reception antenna, and outputs the reception signal amplified by an antenna amplifier to the reception gain control unit 301 and the reception power density detection unit 303.

The reception gain control unit 301 controls the reception gain of each of the plurality of sub-spectra of the reception signal output by the reception unit 300, based on information output from the reception power density detection unit 303. Here, the information output from the reception power density detection unit 303 is information regarding the level of each of the plurality of sub-spectra of the reception signal. In the embodiment, for example, the above information is information regarding the power density of each of the plurality of sub-spectra. The reception gain control unit 301 controls the reception gain of the signal of each sub-spectrum so that the power densities of the plurality of sub-spectra included in the reception signal are uniform. Here, in the embodiment, the transmission gain control unit 202 on the transmission device 101 controls the transmission gain of the signal of each of the plurality of sub-spectra of the transmission signal so that the power densities of the plurality of sub-spectra of the reception signal in the reception device 102 are uniform. Thus, the difference in power density of the reception signal between the plurality of sub-spectra, which is input to the reception gain control unit 301 is small. At the start of a communication, when the control of the transmission gain is not performed on the transmission device 101, the power density difference between the plurality of sub-spectra is large similar to in the related-art. If the power density information of the reception signal for each sub-spectrum is fed back to the transmission device 101 by the feedback unit 304 and the control of the transmission gain is started, the power density difference between the plurality of sub-spectra is decreased.

The band synthesis unit 302 synthesizes the signals of the plurality of sub-spectra output from the reception gain control unit 301 again and outputs the user signal obtained by the synthesis. The band synthesis is performed by a band synthesis filter, for example. Alternatively, the band synthesis unit 302 may perform discrete Fourier transform and inverse discrete Fourier transform to perform band synthesis in the frequency axis. Here, in the embodiment, the band synthesis unit 302 has a function of a frequency shifter that shifts the plurality of sub-spectra which have been subjected to band division and shifted at different frequencies on the transmission device 101, to the original frequencies. The band synthesis unit 302 performs band synthesis of the signals of the plurality of sub-spectra frequency-shifted to the original frequencies.

The reception power density detection unit 303 detects the power densities (for example, the average value of the power density for each sub-spectrum) of the plurality of sub-spectra of the reception signal output by the reception unit 300. The reception power density detection unit 303 outputs the power density information of each sub-spectrum to the feedback unit 304 and also to the reception gain control unit 301. In the embodiment, the average value of the power density for each sub-spectrum may be set as the output of the reception power density detection unit 303, but information indicating the level of the reception signal for each sub-spectrum, for example, information other than the average value of the power density (for example, the reception power of the center frequency).

The feedback unit 304 transmits the power density information of each sub-spectrum output from the reception power density detection unit 303, to the transmission device 101 from the transmission unit 305.

The transmission unit 305 modulates the power density information output by the feedback unit 304 and transmits the modulated information from the antenna to the transmission device 101. The function of modulating the power density information may be provided not on the transmission unit 305 side but on the feedback unit 304 side. In this case, the feedback unit 304 modulates the power density information. The transmission unit 305 transmits the modulated power density information output by the feedback unit 304 from the antenna to the transmission device 101. Here, the power density information transmitted by the feedback unit 304 may be transmitted by overlaying or multiplexed on, for example, a signal transmitted in a normal uplink (a link for transmitting information from the reception device 102 to the transmission device 101).

As described above, in the wireless communication system 100 in the configuration example (1) according to the present embodiment, in a case where a wireless communication is performed by performing band division of the spectrum of a transmission signal into a plurality of sub-spectra, it is possible to avoid deterioration of signal quality by performing control as follows. The control means that the transmission gain control unit 202 controls the transmission power density of each sub-spectrum transmitted from the transmission device 101 based on the power density information of each sub-spectrum, which is fed back from the reception device 102, so that the power densities of the reception signals of the plurality of sub-spectra are uniform.

In principle, if the transmission gain control unit 202 on the transmission device 101 can completely perform control so that the power densities of the plurality of sub-spectra of the reception signal on the reception device 102 are uniform, the reception gain control unit 301 is not necessary. Unfortunately, in practice, since the transmission device 101 and the reception device 102 actually pass through a communication satellite and thus have a long delay, and, for example, a quantization error such as 1 dB step is included in the control performed by the transmission gain control unit 202, it is difficult to cause the power densities of the plurality of sub-spectra of the reception signal on the reception device 102 to be completely uniform only by the transmission gain control unit 202. Thus, in the embodiment, it is assumed that the transmission gain control unit 202 controls the power densities of the plurality of sub-spectra of the transmission signal and the reception gain control unit 301 includes a small power density difference between the plurality of sub-spectra of the reception signal, and the reception gain control unit 301 controls the reception gain.

The wireless communication system 100 according to the embodiment is not limited to the configuration illustrated in FIG. 1 and may have a configuration of directly inputting the reception signal to the band synthesis unit 302 without providing the reception gain control unit 301, as long as the deterioration of signal quality is allowed to some extents. In this case as well, it is possible to avoid the deterioration of signal quality in comparison to a case where only the reception gain control unit 301 performs control of causing the power densities of the plurality of sub-spectra to be uniform.

Configuration Example (2)

Figure 2:
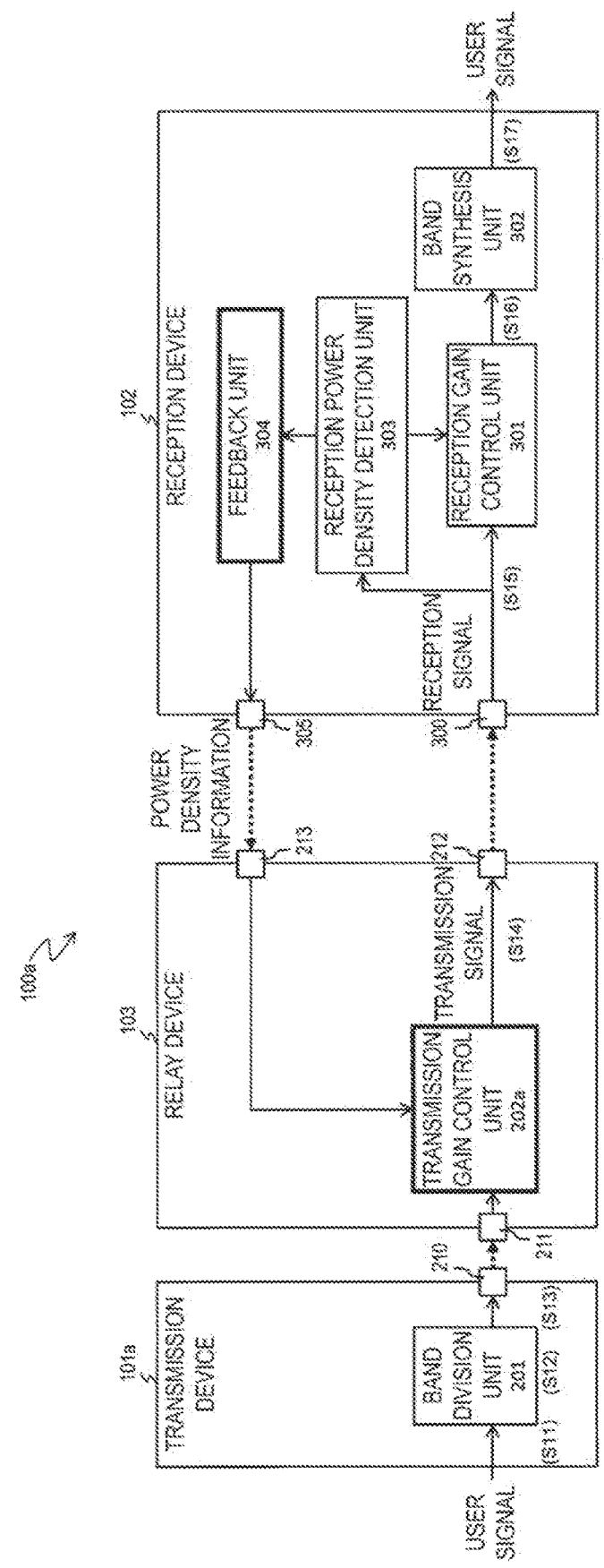
FIG. 2 is a diagram illustrating a configuration example (2) of the wireless communication system according to the embodiment.

FIG. 2 illustrates a wireless communication system 100*a* in a configuration example (2) according to the embodiment. In FIG. 2, the wireless communication system 100*a* includes a transmission device 101*a*, a reception device 102, and a relay device 103. The transmission device 101*a* performs band division of the sub-spectrum of a user signal into a plurality of sub-spectra and transmits the resultant of the band division to the relay device 103 such as a communication satellite. The relay device 103 transmits signals of a plurality of sub-spectra received from the transmission device 101*a* to the reception device 102. The reception device 102 performs band synthesis of the signals of the plurality of sub-spectra received from the relay device 103 to restore the user signal. In this manner, the wireless communication system 100*a* performs band division and synthesis transmission. The relay device 103 is a repeater having non-flat frequency characteristics such as a communication satellite, for example. Thus, when signals of a plurality of sub-spectra transmitted at the same power density on the transmission device 101*a* are received on the reception device 102, a power density difference occurs between the plurality of sub-spectra. Thus, the wireless communication system 100*a* according to the embodiment has a function of performing control so that the power densities of reception signals of the plurality of sub-spectra received on the reception device 102 are uniform.

The configuration of the transmission device 101*a*, the relay device 103, and the reception device 102 will be described below in detail. In FIG. 2, blocks having the same reference signs as those in FIG. 1 operate similarly to the blocks of the configuration example (1) in FIG. 1.

In FIG. 2, the transmission device 101*a* includes the band division unit 201 and a transmission unit 210. The band division unit 201 operates in the similar manner to the band division unit 201 having the same reference sign, which has been described in the configuration example (1) in FIG. 1, to perform band division of the spectrum of a user signal into a plurality of sub-spectra. Here, similar to the configuration example (1), the band division unit 201 has a function of a frequency shifter that shifts a plurality of sub-spectra obtained by band division to different frequencies. The band division unit 201 outputs signals of the plurality of sub-spectra, which have been frequency-shifted, to the transmission unit 210. The transmission unit 210 has a function similar to the transmission unit 203 in the configuration example (1) and transmits a signal output by the band division unit 201 from the antenna.

In this manner, the transmission device 101*a* in the configuration example (2) performs band division of the spectrum of the user signal into a plurality of sub-spectra and then transmits the resultant of the band division to the relay device 103.

Next, in FIG. 2, the relay device 103 includes a transmission gain control unit 202*a*, a reception unit 211, a transmission unit 212, and a reception unit 213.

Similar to the transmission gain control unit 202 in the configuration example (1), the transmission gain control unit 202*a* performs a gain control based on power density information fed back from the reception device 102, so that the power densities of the plurality of sub-spectra obtained by the band division are uniform.

The reception unit 211 converts a signal transmitted from the transmission device 101*a* into a reception signal by a reception antenna and outputs the reception signal to the transmission gain control unit 202*a*.

Similar to the transmission unit 203 in the configuration example (1), the transmission unit 212 transmits a transmission signal output by the transmission gain control unit 202*a* from the antenna to the reception device 102.

Similar to the reception unit 204 in the configuration example (1), the reception unit 213 converts a signal transmitted from the reception device 102 into a reception signal by the reception antenna, demodulates the reception signal, and outputs the information (for example, the power density information) obtained by the demodulation to the transmission gain control unit 202*a*. The demodulation function may be provided not on the reception unit 213 side but on the transmission gain control unit 202*a* side.

As described above, when the relay device 103 receives the signals of the plurality of sub-spectra transmitted from the transmission device 101 and relays the received signals to the reception device 102, the relay device controls the transmission gain of each sub-spectrum received from the transmission device 101 to the reception device 102 so that the power densities of the plurality of sub-spectra of the reception signal in the reception device 102 are uniform.

Next, in FIG. 2, similar to the reception device 102 in the configuration example (1) in FIG. 1, the reception device 102 includes the reception unit 300, the reception gain control unit 301, the band synthesis unit 302, the reception power density detection unit 303, the feedback unit 304, and the transmission unit 305. The operation of each unit of the reception device 102 is the same as that in the configuration example (1) and repetitive description will be omitted. The reception device in the configuration example (2) is different from the configuration example (1) in that the reception unit 300 receives a signal from the relay device 103, and the feedback unit 304 feeds the power density information back to the relay device 103.

As described above, the reception device 102 detects the power density of each of the plurality of sub-spectra received from the relay device 103 and feeds information of the detected power density back to the relay device 103.

The wireless communication system 100*a* in the configuration example (2) according to the embodiment is not limited to the configuration illustrated in FIG. 2. In addition, as described in the configuration example (1), the wireless communication system 100a may have a configuration of directly inputting the reception signal to the band synthesis unit 302 without providing the reception gain control unit 301, as long as the deterioration of signal quality is allowed to some extents.

As described above, in the wireless communication system 100a in the configuration example (2) according to the present embodiment, in a case where a wireless communication is performed by performing band division of the spectrum of a transmission signal into a plurality of sub-spectra, it is possible to perform control as follows to avoid deterioration of signal quality in a case where a repeater having non-flat frequency characteristics, such as a communication satellite relays signals. The control means that the transmission gain control unit 202a performs control based on the power density information of each sub-spectrum, which is fed back from the reception device 102 by the relay device 103, so that the power densities of the plurality of sub-spectra received from the transmission device 101a are uniform, and then transmits the resultant of the control to the reception device 102.

Wireless Communication System 700 in Comparative Example

Figure 3:
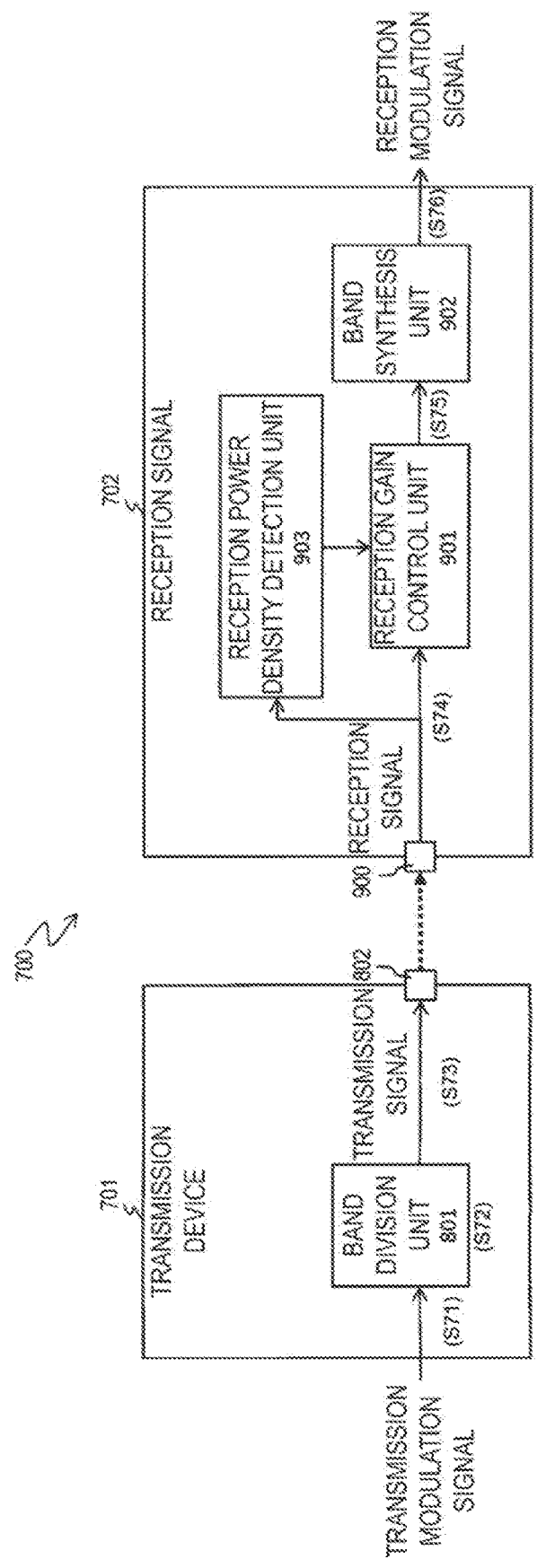
FIG. 3 is a diagram illustrating a configuration example of a wireless communication system in a comparative example.

FIG. 3 is a diagram illustrating a configuration example of a wireless communication system 700 in a comparative example. In FIG. 3, the wireless communication system 700 includes a transmission device 701 and a reception device 702. Here, the wireless communication system 700 in the comparative example has a configuration corresponding to the wireless communication system 100 in the configuration example (1) according to the embodiment described above but may include a relay device between the transmission device 701 and the reception device 702 as in the configuration example (2). The relay device in the comparative example just relays a transmission signal itself of the transmission device 701 to transmit the signal to the reception device 702.

In FIG. 3, the transmission device 701 includes a band division unit 801 and a transmission unit 802. The band division unit 801 operates in the similar manner to the band division unit 201 in the configuration examples (1) and (2) and has a function of performing band division of the spectrum of a user signal into a plurality of sub-spectra and shifting each sub-spectrum to a different frequency. Similar to the transmission unit 210 in the configuration example (2), the transmission unit 802 transmits a signal output by the band division unit 801 from the antenna.

In FIG. 3, the reception device 702 includes a reception unit 900, a reception gain control unit 901, a band synthesis unit 902, and a reception power density detection unit 903.

The reception unit 900 converts a signal transmitted from the transmission device 701 into a reception signal by a reception antenna and outputs the reception signal to the reception gain control unit 901 and the reception power density detection unit 903.

The reception gain control unit 901 controls the reception gain of the signal of each sub-spectrum based on the information obtained by outputting the reception gain of each of the plurality of sub-spectra of the reception signal output by the reception unit 900 from the reception power density detection unit 903, so that the power densities of the plurality of sub-spectra are uniform. Here, the information output from the reception power density detection unit 903 is, for example, information regarding the power density of each of the plurality of sub-spectra.

The band synthesis unit 902 synthesizes the signals of the plurality of sub-spectra output from the reception gain control unit 901 again and outputs the user signal obtained by the synthesis. Here, the band synthesis unit 902 has a function of a frequency shifter that shifts signals of the plurality of sub-spectra which have been subjected to band division and shifted at different frequencies on the transmission device 701, to the original frequencies. The band synthesis unit 902 performs hand synthesis of the signals of the plurality of sub-spectra frequency-shifted to the original frequencies.

The reception power density detection unit 903 detects the power density of each of the plurality of sub-spectra of the reception signal output from the reception unit 900. The reception power density detection unit 903 outputs the power density information of each sub-spectrum to the reception gain control unit 901.

As described above, in the wireless communication system 700 in the comparative example, in a case where a wireless communication is performed by performing band division of the spectrum of a transmission signal into a plurality of sub-spectra, the reception gain of each sub-spectrum is controlled based on the power density information of each sub-spectrum, which is detected on the reception device 702, so that the power densities of reception signals of the plurality of sub-spectra are uniform.

Example of Spectrum in Comparative Example

Next, an example of the spectrum of each unit in the wireless communication system 700 described in the comparative example in FIG. 3 will be described.

Figure 4:
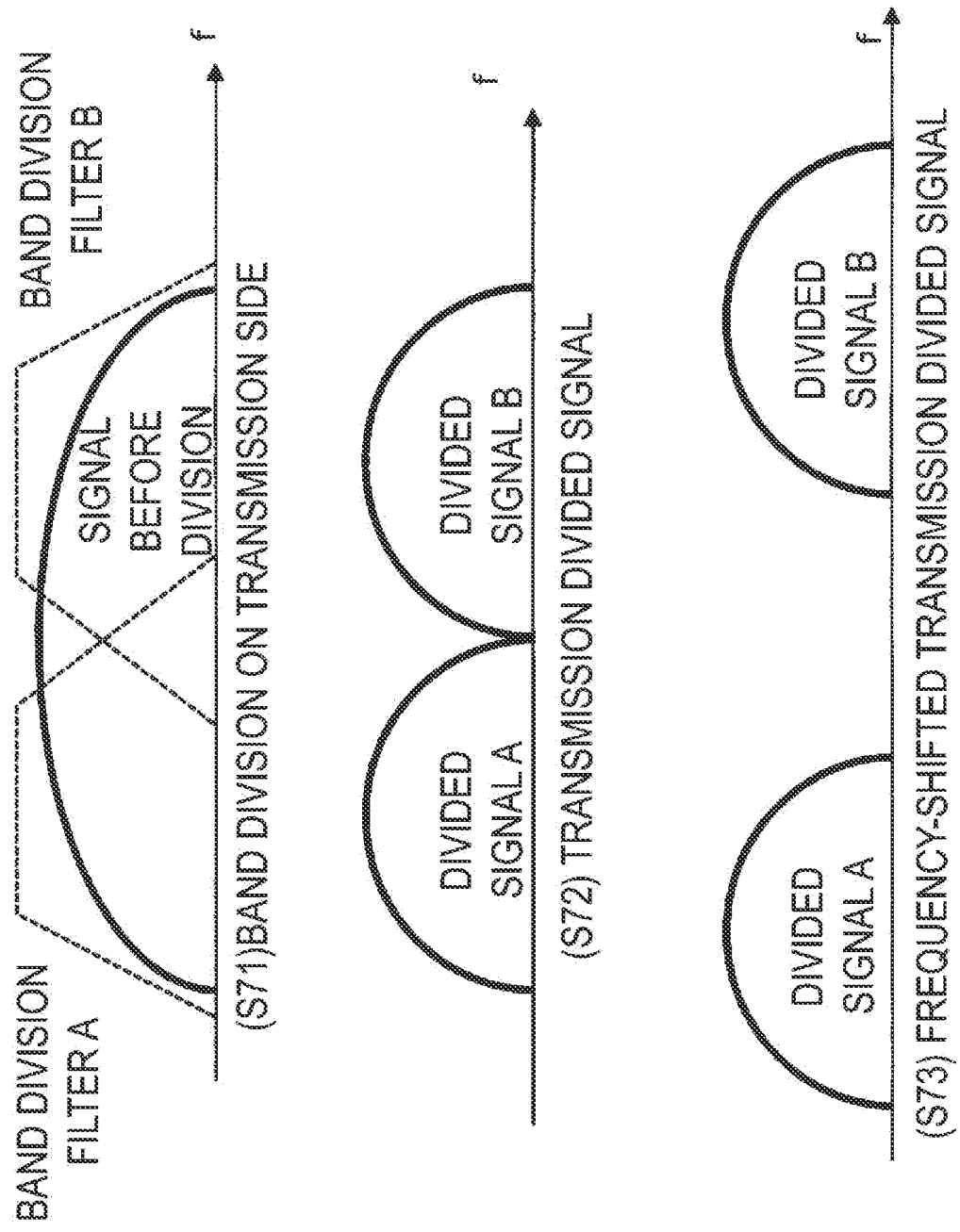
FIG. 4 is a diagram illustrating an example of spectra in S71, S72 and S73 in a transmission device in the comparative example in FIG. 3.

FIG. 4 illustrates an example of spectra in S71, S72 and S73 in the transmission device 701 in the comparative example in FIG. 3. In FIG. 4, (S71) indicates a spectrum of a user signal input to the transmission device 701 before the band division. Here, the band division unit 801 performs band division of the spectrum of the user signal into two spectra of a divided signal A and a divided signal B by a band division filter A and a band division filter B.

In FIG. 4, (S72) indicates a state in which two spectra of the divided signal A and the divided signal B resulting from the band division of the spectrum of the user signal by the hand division filter A and the band division filter B. (S73) indicates a spectrum when the divided signal A and the divided signal B obtained by band division (S72) of the band division unit 801 are shifted at different frequencies. A transmission signal of this spectrum is transmitted from the transmission unit 802 to the reception device 702.

Figure 5:
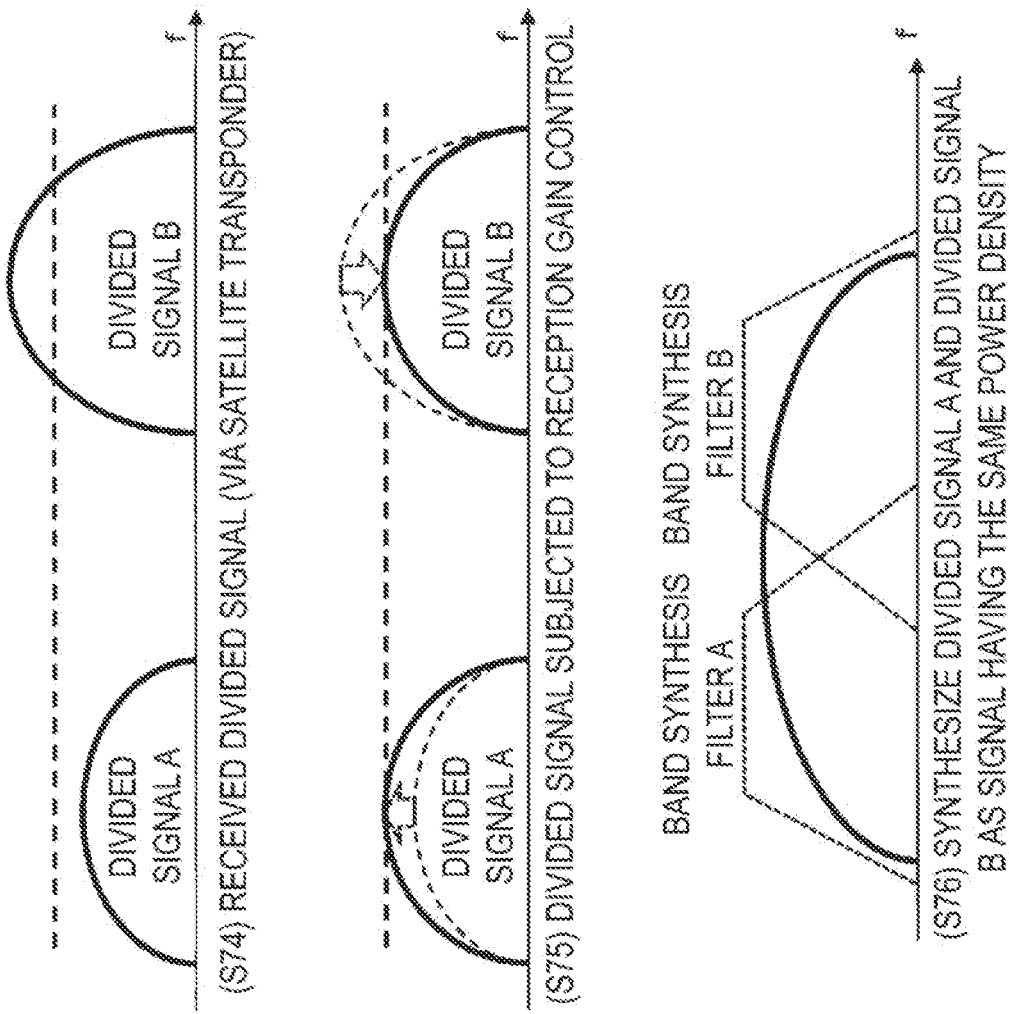
FIG. 5 is a diagram illustrating an example of spectra in S74, S75 and S76 in a reception device of the comparative example in FIG. 3.

FIG. 5 illustrates an example of spectra in S74, S75 and S76 in the reception device 702 in the comparative example in FIG. 3. In FIG. 5, (S74) indicates a spectrum of the reception signal output by the reception unit 900 of the reception device 702. Here, since the transmission device 701 and the reception device 702 perform a communication via a repeater having non-flat frequency characteristics, such as a satellite transponder, for example, when the divided signals A and B transmitted at the same power density are received by the reception device 702 as illustrated in (S73) in FIG. 4, a power density difference may occur between the divided signals A and B as illustrated in (S74) in FIG. 5. Thus, in the wireless communication system 700 in the comparative example, as illustrated in (S75) in FIG. 5, the reception gain control unit 901 controls the reception gains of the divided signals A and B so that the power densities of the divided signals A and B on the reception device 702 are uniform. The divided signals A and B controlled to have the same power density are input to the band synthesis unit 902. After returns to the original frequency before the band division unit 801 in the transmission device 701 performs the shift to a different frequency, as illustrated in (S76) in FIG. 5, the band synthesis unit 902 synthesizes the divided signals A and B as a signal having the same power density by a band synthesis filter A and a band synthesis filter B.

In this manner, in the wireless communication system 700 in the comparative example, in a case where there is a power density difference between reception signals of a plurality of sub-spectra, the reception gain control unit 901 performs control so that the power densities of the plurality of sub-spectra are uniform, to perform band synthesis. Thus, the user signal before the band division in (S71) in FIG. 4, which is transmitted by the transmission device 701 is restored.

Meanwhile, reception noise overlays the antenna amplifier of the reception unit 900 in the reception device 702 illustrated in FIG. 3. Thus, in a case where the reception gain control unit 901 performs gain control of the reception signal, there is a problem in that noise power of noise overlaying the divided signal A is different from noise power of noise overlaying the divided signal B.

Figure 6:
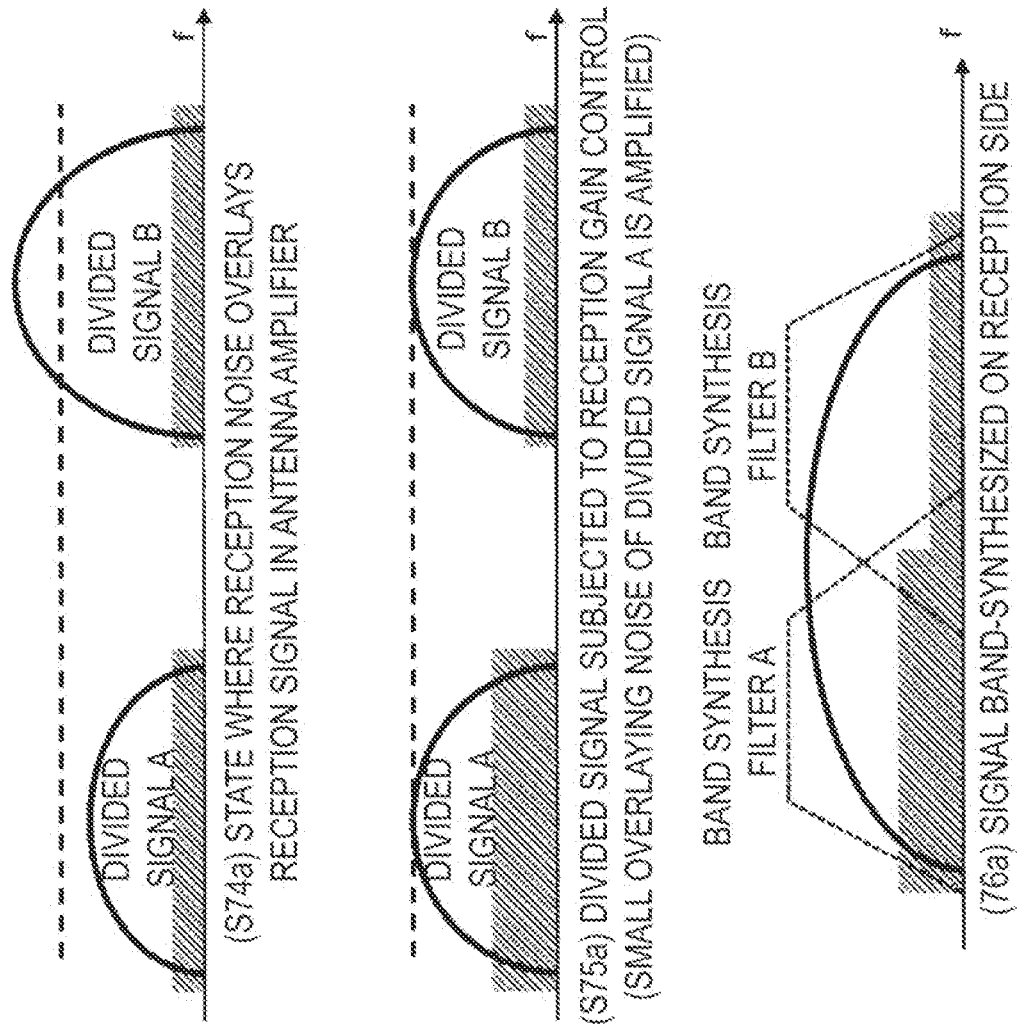
FIG. 6 is a diagram illustrating an example of the reception noise in a wireless communication system in a comparative example.

FIG. 6 is a diagram illustrating an example of the reception noise in the wireless communication system 700 in the comparative example. A spectrum in (S74a) in FIG. 6 indicates a state in which reception noise overlays the spectrum in (S74) in FIG. 5. A spectrum in (S75a) in FIG. 6 indicates a state in which reception noise overlays the spectrum in (S75) in FIG. 5. A spectrum in (S76a) in FIG. 6 indicates a state in which reception noise overlays the spectrum in (S76) in FIG. 5.

In the spectrum of (S74a) in FIG. 6, reception noise by the antenna amplifier or the like of the reception unit 900 overlays the reception signal output by the reception unit 900 in the reception device 702. Here, in the reception signal output from the reception unit 900, the level of the reception noise of the divided signal A having a power density smaller than that of the divided signal B is equal to the level of the reception noise of the divided signal B having a power density larger than that of the divided signal A. As illustrated in FIG. 5, the reception gain control unit 901 controls the reception min of each of the divided signals so that the power densities of the divided signals A and B are uniform.

(S75a) in FIG. 6 is the spectrum after gain control by the reception gain control unit 901. In the spectrum of (S75a) in FIG. 6, the divided signal A having a power density smaller than the divided signal B is amplified, so the reception noise also increases. Conversely, the divided signal B having a power density greater than the divided signal A is attenuated, so the reception noise also increases. In this manner, the reception gain control unit 901 causes a level difference between the reception noise included in the gain-controlled divided signal A and the reception noise included in the divided signal B, and the band synthesis unit 902 performs band synthesis of the divided signals A and B in a state where the level difference occurs.

(S76a) in FIG. 6 indicates a spectrum in which the band synthesis unit 902 performs band synthesis of the divided signals A and B by the band synthesis filter A and the band synthesis filter B, in a state where the level difference occurs. In (S76a) in FIG. 6, the noise power overlaying on the band of the divided signal A synthesized by the band synthesis filter A is greater than the noise power overlaying the band of the divided signal B synthesized by the band synthesis filter B.

As described above, when band synthesis is performed in a state where the C/N ratios of the respective divided signals are greatly different from each other, small noise power overlays the bands of some reception signals, and large noise power overlays the bands of the other reception signals. Thus, a problem of signal quality being deteriorated occurs.

Example of Spectrum in Embodiment

Next, an example of the spectrum of each unit of the wireless communication system 100 described in the configuration example (1) in FIG. 1 and the wireless communication system 100a described in the configuration example (2) in FIG. 2 will be described.

Figure 7:
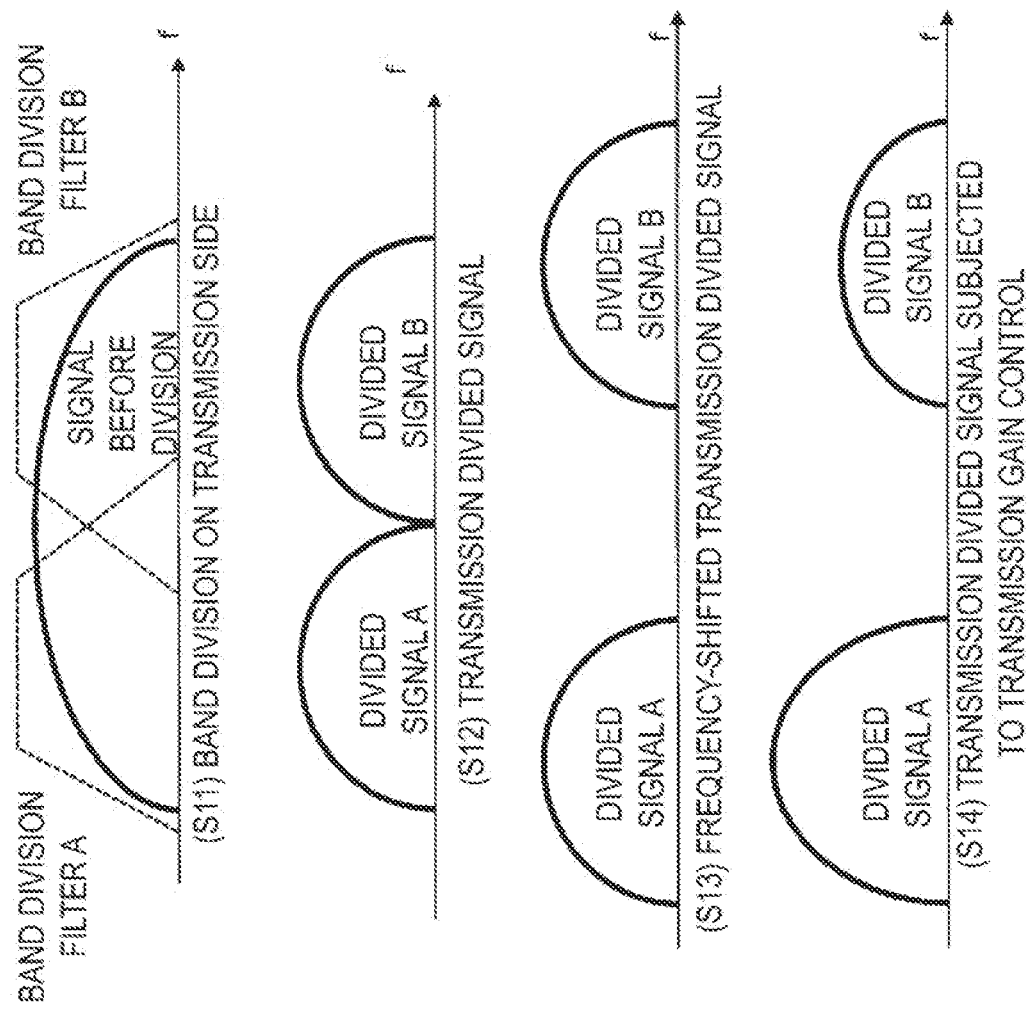
FIG. 7 is a diagram illustrating an example of the spectrum in each unit in the configuration example (1) and the configuration example (2).

FIG. 7 illustrates an example of the spectrum in each unit in the configuration example (1) and the configuration example (2).

In FIG. 7, (S11) indicates a spectrum of the user signal before division, which is input by the transmission device 101 (or the transmission device 101a). Here, the band division unit 201 performs band division of the spectrum of the user signal into two spectra of a divided signal A and a divided signal B by a band division filter A and a band division filter B. In the comparative example and the embodiment described above, a case where band division is performed into two sub-spectra of the divided signals A and B has been described, but the above description is similarly applied to a case where band division is performed into a plurality (three or more) of sub-spectra.

In FIG. 7, (S12) indicates a state in which the spectrum of the user signal is band-divided into two spectra of the divided signal A and the divided signal B resulting from the band division of the spectrum of the user signal by the band division filter A and the band division filter B, (S13) indicates a spectrum when the divided signals A and B obtained by band division of the band division unit 201 in (S12) are shifted to different frequencies. Furthermore, (S14) indicates spectra of the divided signals A and B after the transmission gain is controlled by the transmission gain control unit 202 (or the transmission gain control unit 202a) based on the power density information fed back from the reception device 102. Here, since the reception power density of the divided signal A fed back from the reception device 102 is smaller than the reception power density of the divided signal B, the transmission gain control unit 202 (or the transmission gain control unit 202a) controls the transmission gain of the divided signal A to increase the transmission power density and conversely controls the transmission gain of the divided signal B to decrease the transmission power density so that the reception power density becomes uniform. Thus, the spectra (S13) of the divided signals A and B input to the transmission gain control unit 202 (or the transmission gain control unit 202a) are adjusted like the spectrum (S14) and output from the transmission gain control unit 202 (or the transmission gain control unit 202a), and the adjusted divided signals A and B are transmitted from the transmission unit 203 to the reception device 102.

Figure 8:
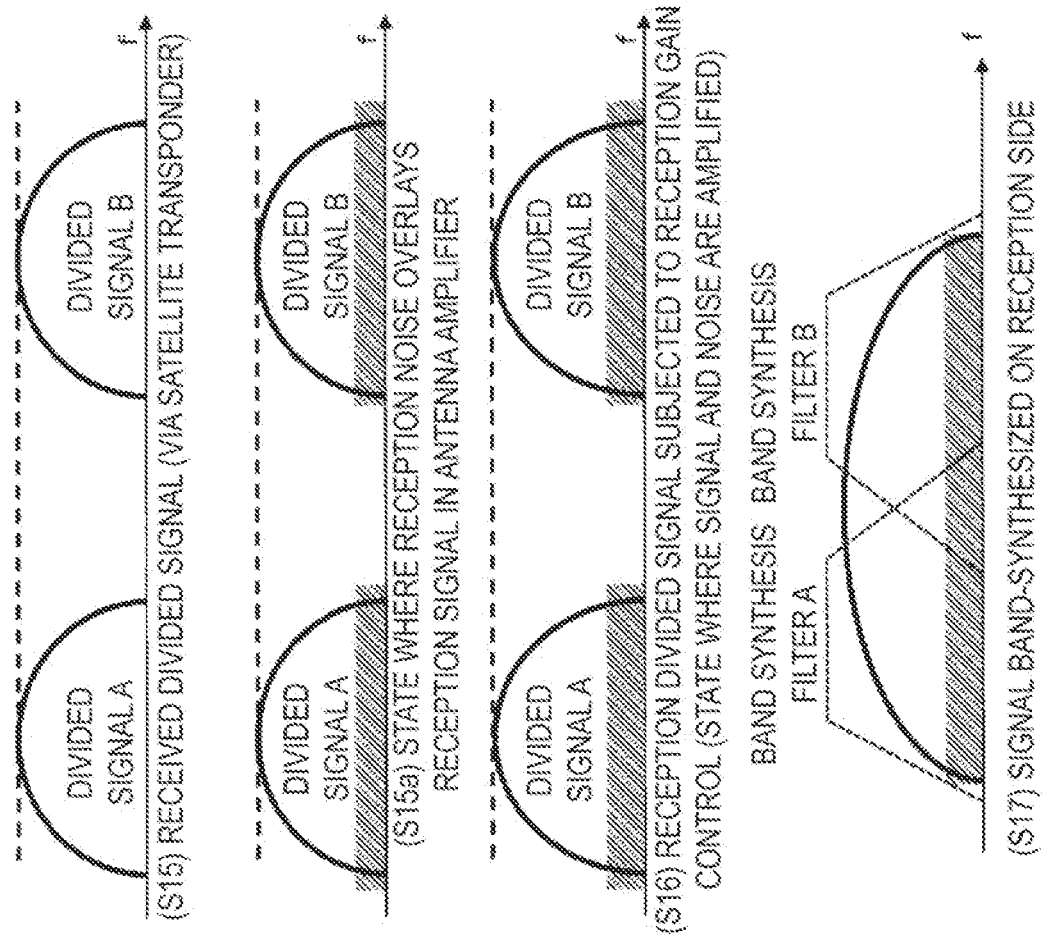
FIG. 8 is a diagram illustrating an example of the spectrum in each unit in the configuration example (1) and the configuration example (2).

FIG. 8 illustrates an example of the spectrum in each unit in the configuration example (1) and the configuration example (2). In FIG. 8, (S15) indicates a spectrum of the reception signal output by the reception unit 300 of the reception device 102. Here, since a communication is performed by the reception signal of the reception device 102 passing through a repeater having a non-flat frequency characteristic such as a satellite transponder, for example, the power density difference occurs between the divided signals A and B as illustrated in (S74) in FIG. 5 in the comparative example. However, in the embodiment, since the transmission device 101 (or the relay device 103) controls the transmission gain so that there is no power density difference between the divided signals A and B received by the reception device 102, the power density difference hardly occurs between the divided signals A and B as illustrated in (S15) in FIG. 8.

A spectrum indicated in (S15a) in FIG. 8 indicates a state in which the reception noise overlays the signal of (S15) by the antenna amplifier of the reception unit 300 or the like. The reception gain control unit 301 controls the reception gains of the divided signals A and B output from the reception unit 300 so that the power densities of the divided signals A and B received on the reception device 102 are uniform. Here, in the configuration example (1) and the configuration example (2) according to the embodiment, the transmission device 101 or the relay device 103 controls the transmission gain and performs transmission so that the power densities of the divided signals A and B received on the reception device 102 are uniform. Thus, even though the reception gain is not controlled by the reception gain control unit 301, as illustrated in (S16) in FIG. 8, a level difference hardly occurs between the noise overlaying the divided signal A and the noise overlaying the divided signal B. Thus, the band synthesis unit 302 can perform band synthesis of the divided signals A and B having the same power density on which equivalent noises overlay. (S17) in FIG. 8 indicates a spectrum in which the band synthesis unit 302 performs band synthesis of the divided signals A and B by the band synthesis filter A and the band synthesis filter B. In (S17) in FIG. 8, the noise power overlaying the band of the divided signal A synthesized by the band synthesis filter A and the noise power overlaying the band of the divided signal B synthesized by the band synthesis filter B have the equivalent levels and the equivalent C/N ratios. As described above, in the wireless communication system 100 in the configuration example (1) and the wireless communication system 100a in the configuration example (2) according to the embodiment, since the band synthesis is not performed in a state where the C/N ratio for each divided signal is greatly different as in the wireless communication system 700 in the comparative example, it is possible to avoid the deterioration of signal quality.

Figure 9:
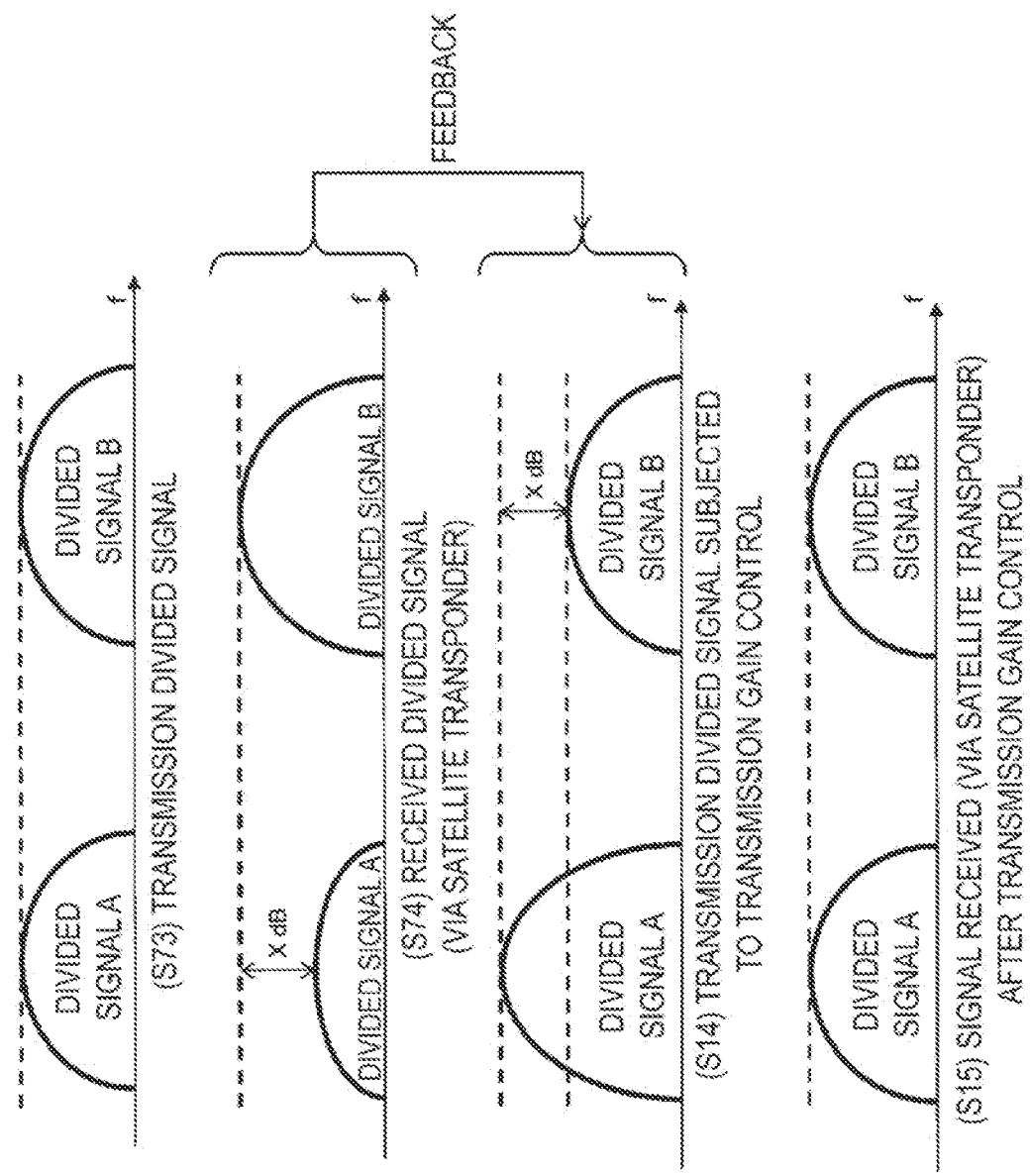
FIG. 9 is a diagram illustrating an example of power density information fed back from a reception device to a transmission device (or a relay device).

FIG. 9 illustrates an example of power density information fed back from the reception device 102 to the transmission device 101 (or the relay device 103). In FIG. 9, the spectra of (S73), (S73), (S73), and (S73) correspond to the spectrum having the same reference signs described in FIGS. 4 to 8. In a case where the transmission gain control unit 202 (or the transmission gain control unit 202a) does not control the transmission gains of the divided signals A and B, as described above, a power density difference of X dB occurs between the divided signals A and B received and output by the reception unit 300 in the reception device 102, as illustrated in (S74) of FIG. 9. The reception power density detection unit 303 detects the power density difference of X dB. The feedback unit 304 sets the information of the power density difference of X dB as the power density information and feeds such information back to the transmission gain control unit 202 in the transmission device 101 (or the transmission gain control unit 202a in the relay device 103). Then, based on the fed-back information, the transmission device 101 (or the relay device 103) controls the transmission gain so that the transmission power density of the divided signal A is larger than the transmission power density of the divided signal B by X dB and transmits the divided signals A and B, as illustrated in (S14) in FIG. 9. Thus, as illustrated in (S15) in FIG. 9, the reception device 102 can receive the divided signals A and B at the same power density.

The power density information to be fed back may be an actual measurement value of the power density for each divided signal (for each sub-spectrum) or a relative power density difference between a plurality of divided signals (a plurality of sub-spectra). Alternatively, the power density information may be a difference from a reference value of a predetermined power density. In this case, the power density information indicating, for example, that the divided signal A is −10 dB, and the divided signal B is +5 dB is fed back from the feedback unit 304 to the transmission device 101 or the relay device 103. The transmission gain control unit 202 or the transmission gain control unit 202a controls the transmission gain of the divided signal A to be +10 dB and the transmission gain of the divided signal B to be −5 dB, respectively, and transmits the divided signals A and B. Thus, the reception device 102 can receive the divided signals A and B at the same power density.

Hitherto, as described in the embodiment, according to the present invention, a wireless communication system is capable of avoiding deterioration of signal quality by controlling the transmission gain of each sub-spectrum transmitted from a transmission device so that power densities of reception signals of a plurality of sub-spectra are uniform, in the wireless communication system that performs a wireless communication by performing band division of a spectrum of a transmission signal into the plurality of sub-spectra.

REFERENCE SIGNS LIST 100, 100a, 700 Wireless communication system
101, 101a, 701 Transmission device
102, 102a, 702 Reception device
103 Relay device
201, 801 Band division unit
202, 202a Transmission gain control unit
203, 210, 212, 305, 802 Transmission unit
204, 211, 213, 300, 900 Reception unit
301, 901 Reception gain control unit
302, 902 Band synthesis unit
303, 903 Reception power density detection unit
304 Feedback unit

The invention claimed is:
1. A wireless communication system that performs a wireless communication by performing band division of a spectrum of a transmission signal into a plurality of sub-spectra, the wireless communication system comprising a transmission device and a reception device, wherein
the transmission device includes:
a band division unit configured to perform the band division of the transmission signal into the plurality of sub-spectra; and
a transmission gain control unit configured to control a transmission gain of each of a plurality of the transmission signals of the plurality of sub-spectra for each of the plurality of sub-spectra in accordance with information that is related to a power density of each of the plurality of sub-spectra and fed back from the reception device so that the power density of a reception signal of each of the plurality of sub-spectra on the reception device is uniform,
the reception device includes:
a reception power density detection unit configured to detect the power density of each of the plurality of sub-spectra to be received from the transmission device;
a feedback unit configured to feed back to the transmission device the information regarding the power density of each of the plurality of sub-spectra; and a band synthesis unit configured to perform band synthesis of a plurality of the reception signals of the plurality of sub-spectra, and the information regarding the power density of each of the plurality of sub-spectra corresponds to one of:
an average value of the power density of each of the plurality of sub-spectra; and
reception power of a center frequency of each of the plurality of the reception signals of each of the plurality of sub-spectra.

2. The wireless communication system according to claim 1, wherein
the reception device further includes:
a reception gain control unit configured to control a reception gain of each of the plurality of the reception signals of each of the plurality of sub-spectra in accordance with the power density of each of the plurality of the reception signals of each of the plurality of sub-spectra detected by the reception power density detection unit so that the power density of each of the plurality of the reception signals of the plurality of sub-spectra is uniform, and
the reception gain control unit is configured to output the controlled reception gain to the band synthesis unit.

3. A wireless communication system that performs a wireless communication by performing band division of a spectrum of a transmission signal into a plurality of sub-spectra, the wireless communication system comprising a transmission device, a reception device, and a relay device, wherein
the transmission device includes:
a band division unit configured to perform the band division of the transmission signal into the plurality of sub-spectra,
the relay device includes:
a transmission gain control unit configured to control a transmission gain for each of the plurality of sub-spectra when signals of the plurality of sub-spectra received from the transmission device are transmitted to the reception device in accordance with information that is related to a power density of each of the plurality of sub-spectra and fed back from the reception device so that the power density of the plurality of sub-spectra on the reception device is uniform,
the reception device includes:
a reception power density detection unit configured to detect the power density of each of the plurality of sub-spectra to be received from the transmission device;
a feedback unit configured to feed back to the relay device the information regarding the power density of each of the plurality of sub-spectra; and
a band synthesis unit configured to perform band synthesis of a plurality of reception signals of the plurality of sub-spectra, and
the information regarding the power density of each of the plurality of sub-spectra corresponds to one of:
an average value of the power density of each of the plurality of sub-spectra; and
reception power of a center frequency of each of the plurality of reception signals of each of the plurality of sub-spectra.

4. The wireless communication system according to claim 3, wherein
the reception device further includes:
a reception gain control unit configured to control a reception gain of each of the plurality of reception signals in accordance with the power density of each of the plurality of sub-spectra detected by the reception power density detection unit so that the power density of each of the plurality of reception signals of the plurality of sub-spectra is uniform, and
the reception gain control unit is configured to output the controlled reception gain to the band synthesis unit.

5. The wireless communication system according to claim 1, wherein
the information regarding the power density of each of the plurality of sub-spectra, which is fed back to the transmission device, corresponds to one of:
an actual measurement value of the power density for each of the plurality of sub-spectra;
a relative power density difference between the plurality of sub-spectra; and
a difference from a predetermined reference value of the power density.

6. The wireless communication system according to claim 2, wherein
the information regarding the power density of each of the plurality of sub-spectra, which is fed back to the transmission device, corresponds to one of:
an actual measurement value of the power density for each of the plurality of sub-spectra;
a relative power density difference between the plurality of sub-spectra; and
a difference from a predetermined reference value of the power density.

7. The wireless communication system according to claim 3, wherein
the information regarding the power density of each of the plurality of sub-spectra, which is fed back to the transmission device, corresponds to one of:
an actual measurement value of the power density for each of the plurality of sub-spectra;
a relative power density difference between the plurality of sub-spectra; and
a difference from a predetermined reference value of the power density.

8. The wireless communication system according to claim 4, wherein
the information regarding the power density of each of the plurality of sub-spectra, which is fed back to the transmission device, corresponds to one of:
an actual measurement value of the power density for each of the plurality of sub-spectra;
a relative power density difference between the plurality of sub-spectra; and
a difference from a predetermined reference value of the power density.

* * * * *